United States Patent
Huang et al.

(10) Patent No.: US 7,957,972 B2
(45) Date of Patent: Jun. 7, 2011

(54) VOICE RECOGNITION SYSTEM AND METHOD THEREOF

(75) Inventors: Yen-Son Paul Huang, Saratoga, CA (US); Bo-Ren Bai, Chia-Yi County (TW); Younan Lu, Palo Alto, CA (US); Zhen Hou, Beijing (CN); Ming Zhang, Cupertino, CA (US)

(73) Assignee: Fortemedia, Inc., Cupertino ( * ) Notice: Subject to any disclaimer, the term of this patent is extended or adjusted under 35 U.S.C. 154(b) by 1066 days.

(21) Appl. No.: 11/672,472

(22) Filed: Feb. 7, 2007

(65) Prior Publication Data

US 2008/0059193 A1   Mar. 6, 2008

Related U.S. Application Data

(60) Provisional application No. 60/842,693, filed on Sep. 5, 2006.

(51) Int. Cl.
*G10L 13/08* (2006.01)

(52) U.S. Cl. ............... 704/260; 704/270; 704/270.1; 704/235; 379/67.1; 379/88.01; 381/110

(58) Field of Classification Search .......... 704/270, 704/275, 270.1, 233, 257, 260, 235; 379/67.1, 379/216.01, 88.01, 218.01; 381/110
See application file for complete search history.

(56) References Cited

U.S. PATENT DOCUMENTS

| | | | | |
|---|---|---|---|---|
| 4,870,686 A * | 9/1989 | Gerson et al. | ........... | 704/234 |
| 5,355,433 A * | 10/1994 | Yasuda et al. | ........... | 704/243 |
| 5,715,369 A * | 2/1998 | Spoltman et al. | ......... | 704/270 |
| 5,732,190 A * | 3/1998 | Hamasaki et al. | ........... | 704/233 |
| 5,835,570 A * | 11/1998 | Wattenbarger | ............. | 379/88.03 |
| 5,933,775 A * | 8/1999 | Peters | .................. | 455/420 |
| 5,974,382 A * | 10/1999 | Fado et al. | .................... | 704/270 |
| 6,049,594 A * | 4/2000 | Furman et al. | ................ | 379/67.1 |
| 6,078,568 A * | 6/2000 | Wright et al. | ................. | 370/312 |
| 6,249,759 B1 * | 6/2001 | Oda | ............................. | 704/222 |
| 6,366,882 B1 * | 4/2002 | Bijl et al. | ....................... | 704/235 |
| 6,732,078 B1 * | 5/2004 | Luomi et al. | ............... | 704/270.1 |
| 7,216,082 B2 * | 5/2007 | Okubo et al. | ................. | 704/275 |
| 7,328,157 B1 * | 2/2008 | Chu et al. | ...................... | 704/260 |
| 7,590,538 B2 * | 9/2009 | St. John | ........................ | 704/246 |
| 7,676,363 B2 * | 3/2010 | Chengalvarayan et al. | .. | 704/233 |
| 7,689,417 B2 * | 3/2010 | Huang et al. | .................. | 704/246 |
| 2007/0032225 A1 * | 2/2007 | Konicek et al. | ............... | 455/417 |
| 2008/0059191 A1 * | 3/2008 | Huang et al. | .................. | 704/260 |
| 2008/0103781 A1 * | 5/2008 | Wasson et al. | ................ | 704/277 |

FOREIGN PATENT DOCUMENTS

| | | |
|---|---|---|
| CN | 1391210 | 1/2003 |
| JP | 2001-51694 | 2/2001 |
| JP | 2003-319070 | 11/2003 |

* cited by examiner

*Primary Examiner* — Vijay B Chawan

(57) ABSTRACT

A voice recognition system and method thereof. The communication system comprises a setup controller, a voice recognition controller, and an application controller. The setup controller receives a voice keyword table including a voice recognizable keyword and a corresponding application instruction. The voice recognition controller, coupled to the setup controller, receives the voice keyword table from the setup controller, receives a first voice input, and matches a first voice input to the voice recognizable keyword to determine the corresponding application instruction. The application controller, coupled to the voice recognition controller, receives and performs the corresponding application instruction. The setup controller, the voice recognition controller, and the application controller communicate through wireless communication.

20 Claims, 7 Drawing Sheets

| Label | Adaptive voice keyword | Default voice keyword | Application |
|---|---|---|---|
| $L_1$ | $V_{A1}$ | $V_{D1}$ | $A_{p1}$ |
| $L_2$ | $V_{A2}$ | $V_{D2}$ | $A_{p2}$ |
| ⋯ | ⋯ | ⋯ | ⋯ |
| $L_i$ | $V_{Ai}$ | $V_{Di}$ | $A_{pi}$ |
| ⋯ | ⋯ | ⋯ | ⋯ |
| $L_n$ | $V_{An}$ | $V_{Dn}$ | $A_{pn}$ |

| Label | Adaptive voice keyword | Default voice keyword | Application |
|---|---|---|---|
| Brian Smith | Brian | breɪ ən smɪθ | Dialing 123-555-1000 |
| 家 | Jia | dʒɑ | Dialing 123-555-1001 |

| Label | Adaptive voice keyword | Default voice keyword | Application |
|---|---|---|---|
| HOME<br>VOICE MAIL<br>SPEEDIAL [1-9]<br>MEMORY [1-9]<br>SETUP MENU | HOME<br>VOICE MAIL<br>SPEEDIAL [1-9]<br>MEMORY [1-9]<br>SETUP | hom<br>vɔɪs meɪ<br>spidəɹeɪ [wuhn...]<br>mɛməɹi [wuhn...]<br>sɛmtʌp mɛnju | Dialing 123-555-5555<br>Dialing 123-555-5556<br>Dialing 123-555-5557<br>Dialing 123-555-5558<br>Entering setup menu |

FIG. 2c

VOICE RECOGNITION SYSTEM AND METHOD THEREOF

This application claims the benefit of U.S. Provisional Application Ser. No. 60/842,693, the entire disclosure of which is hereby incorporated by reference.

BACKGROUND OF THE INVENTION

1. Field of the Invention

The invention relates to voice recognition, and in particular to a communication system providing voice recognition and a method thereof.

2. Description of the Related Art

A voice recognition controller is a device with the ability to recognize keywords provided by a user and generate corresponding outputs, for example, commands or text-strings, for use by an application device, such as DVD/MP3 players, mobile phones, car radio, and car controllers.

The voice recognition controller may be a Bluetooth speakerphone for use with a mobile telephone provided with Bluetooth functionality in a communication system, in which the voice controller speakerphone and mobile telephone are paired. A voice recognition engine on the voice controller is implemented to recognize a name with reference to a user-defined name list and output a corresponding telephone number. A dialing function on the mobile telephone will then dial the number, and the user is able carry on a conversation through the mobile telephone via the speakerphone.

There is a need for a communication system employing a voice recognition controller with improved voice recognition rate.

BRIEF SUMMARY OF THE INVENTION

A detailed description is given in the following embodiments with reference to the accompanying drawings.

According to the invention, a communication system comprises a setup controller, a voice recognition controller, and an application controller. The setup controller receives a voice keyword table including a voice recognizable keyword and a corresponding application instruction. The voice recognition controller, coupled to the setup controller, receives the voice keyword table from the setup controller, receives a first voice input, and matches a first voice input to the voice recognizable keyword to determine the corresponding application instruction. The application controller, coupled to the voice recognition controller, receives and performs the corresponding application instruction. The setup controller, the voice recognition controller, and the application controller communicate through wireless communication.

A method of voice recognition in a communication system is also disclosed, comprising a setup controller receiving a voice keyword table including a voice recognizable keyword and a corresponding application instruction, a voice recognition controller receiving the voice keyword table and matching a first voice input thereto to determine the corresponding application instruction, and an application controller receiving and performing the corresponding application instruction.

BRIEF DESCRIPTION OF THE DRAWINGS

The invention can be more fully understood by reading the subsequent detailed description and examples with references made to the accompanying drawings, wherein:

FIGS. 2a, b and c illustrate exemplary voice keyword tables incorporated in the communication system of FIG. 1.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
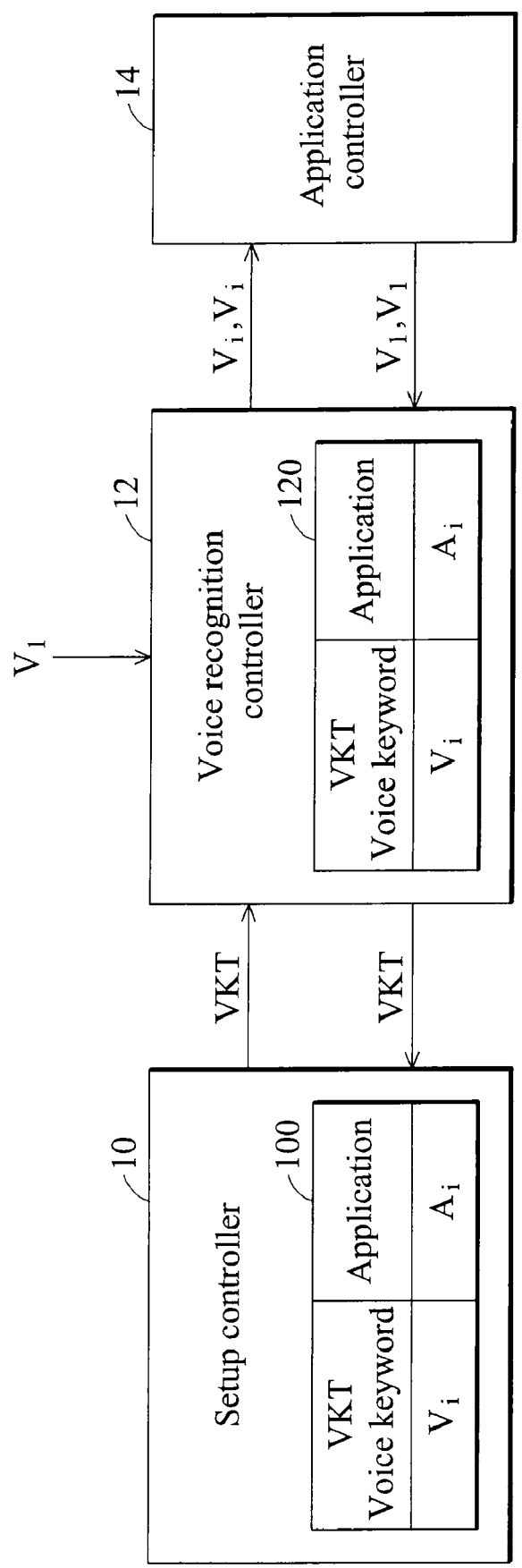
FIG. 1 is a block diagram of an exemplary communication system of the invention.

FIG. 1 is a block diagram of an exemplary communication system of the invention, comprising setup controller 10, voice recognition controller 12, and application controller 14. Setup controller 10 is coupled to voice recognition controller 12, and to application controller 14.

Setup controller 10 may be a personal computer or personal digital assistant (PDA). Setup controller 10 comprises voice keyword table VKT 100, comprising voice recognizable keywords and corresponding application instructions. Voice keyword table VKT 100 may contain at least 1 set of voice keyword Vi and application instruction Ai pair. Voice recognition is performed by searching an input voice data from all voice keywords Vi. Voice recognition is classified by three general classes, namely speaker independent (SI), speaker dependent (SD) and speaker adapted (SA). In the SI system, a voice recognition engine identifies utterances according to universal acoustic models generated from samples obtained from a large training population. An example of commercial software application using SI models is Microsoft Speech Recognizer. As no individual training by the user is required, such systems are convenient. However, these systems generally have low recognition performance, especially when used by speakers with heavy accents or whose speech patterns otherwise diverge from the training population. On the other hand, SD systems require users to provide samples for every keyword, which can become burdensome and memory intensive for large lists of keywords. Voice keyword table VKT 100 may be edited by input such as a keyboard or a keypad, or imported from an established database such as a phonebook in an application such as Outlook, Skype, MSN, or Yahoo Messenger.

FIG. 2a illustrates the exemplary voice keyword table incorporated in the communication system in FIG. 1, comprising label field 20a, adaptive voice keyword field 22a, default voice keyword field 24a, and application field 26a. Label field 20a contains name tags $L_1, L_2, \ldots, L_i, \ldots,$ and $L_n$ entered by the user. Each name tag Li may be converted to default voice keyword $V_{Di}$ through a speaker independent (SI) text-to-speech (TTS) algorithm in setup controller 10. Default voice keywords are voice recognizable keywords to which an input voice data stream is compared. Default keyword field 24 need not be viewable. Setup controller 10 comprises a microphone for voice input. The user may further enter corresponding adaptive voice keywords $V_{A1}$ to $V_{An}$ in adaptive voice keyword field 22 as alternative voice recognizable keywords. Adaptive voice keyword $K_{ai}$ may be adaptive to individual pronunciation parameters. Application field 26 provides application instruction $A_{P1}$ for execution upon recognition of default voice keyword $V_{A1}$ or adaptive voice keyword $V_{A1}$ in setup controller 10.

Referring to FIG. 1, voice recognition controller 12 receives voice keyword table VKT 100 from setup controller 10, and receives first voice input $V_1$ to perform first layer voice recognition (VR), i.e., seeking first voice input $V_1$ from the voice recognizable keywords in voice keyword table VKT 120, thereby determining the corresponding application instruction. After locating first voice input $V_1$ in voice keyword table VKT 120, voice recognition controller 12 transmits the corresponding application instruction to application controller 14 for execution. Voice recognition controller 12 may be a low-profile portable device such as a headset, speakerphone, or headset with VR functionality. Application controller 14 may be a cellular phone, DVD player, MP3 player, car radio, car controller, or any electronic consumer appliance.

Voice recognition controller 12 transmits first voice input $V_1$ to application controller 14 if no match is found for the first voice input in the voice keyword table. Application controller 14 further performs second layer voice recognition, i.e., determining a corresponding application instruction based on first voice input $V_1$, and transmits first voice input $V_1$ and the corresponding application instruction to voice recognition controller 12. The second layer voice recognition may be implemented by a local voice keyword table comprising other voice keywords and the corresponding applications in application controller 14, such that first voice input $V_1$ is matched to one of the other voice keywords, thereby finding and performing the corresponding application $A_1$. Application controller 14 then executes the corresponding application $A_1$. The second layer voice reorganization recognizes more voice keywords than the first in voice reorganization controller 12. Application controller 14 may further feed first voice input $V_1$ the corresponding application $A_1$ back to voice recognition controller 12 so that voice recognition controller 12 can recognize first voice input $V_1$, thereby improving voice reorganization rate.

Setup controller 10, voice recognition controller 12, and application controller 14 communicate through wired or wireless communication. The wireless communication may be, for example, Bluetooth, Wireless LAN, WiFi, or equivalent.

Setup controller 10, comprising self diagnostic function, receives second voice input $V_2$ for comparison with a voice recognizable keyword in voice keyword table VKT 120, and validates the voice recognizable keyword if second voice input $V_2$ matches the voice recognizable keyword, allowing the user to change the voice recognizable keyword in setup controller 10.

Voice keyword table VKT may be a phonebook, voice recognizable keyword is a pronunciation of a name entry, and the corresponding application instruction dialing a predetermined number. FIG. 2b shows an exemplary voice keyword table VKT in FIG. 1. Label fields 20b contain user-defined name entries, for example, "Brian Smith" and " "家" " Default voice keyword field 24b comprises machine-generated phonetic data including phoneme string converted from the name entries through word-to-phoneme algorithm and the corresponding speaker independent models for speech recognition and text-to-speech generated voice. Adaptive voice keyword field 22b includes user-defined phonetic data, possibly different from the phonetic data in default voice keyword field 24b, it provides capability for users to further personalize data defined in 24b to enhance the voice recognition performance and voice prompt quality of the system. The corresponding application instructions are text-strings, such as dialing the telephone numbers in the application filed 26b.

Voice keyword table VKT may be a voice command table, the voice recognizable keyword pronunciation of a voice command entry, and the corresponding application instruction of a built-in command or a user-defined command. FIG. 2c shows another exemplary voice keyword table VKT in FIG. 1. Label field 20c stores command labels such as "HOME", "VOICEMAIL", "SPEEDIAL[1-9]", "MEMORY [1-9]", or "SETUP MENU", default voice keyword field 24c contains the corresponding default phonetic data, adaptive voice keyword field 22c are the adaptive phonetic data. Both the default and adaptive phonetic data are voice recognizable keywords correspond to specific commands. For example, the default phonetic or adaptive phonetic data corresponding to "HOME" maps to the application instruction of dialing a home number, "VOICEMAIL" maps to dialing a voicemail number, "SPEEDIAL[1-9]" maps to dialing a number according to the speed dial digit 1 to 9, "MEMORY[1-9]" maps to dialing a number in memory 1 to 9, and "SETUP MENU" maps to entering the setup menu.

Figure 3:
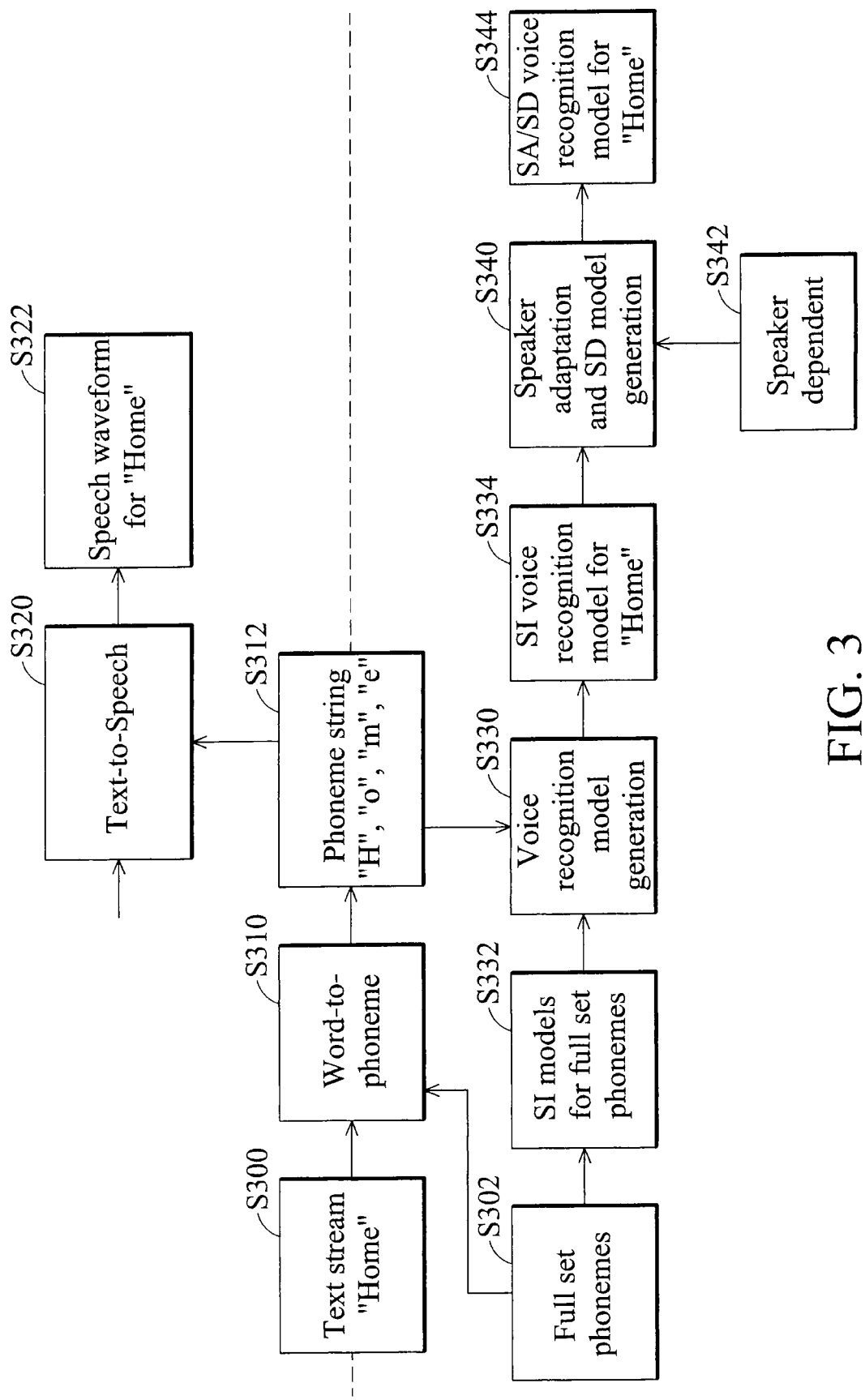
FIG. 3 illustrates an exemplary method of text-to-speech (TTS) conversion and voice recognition models generation of the invention.

FIG. 3 illustrates an exemplary method of text-to-speech (TTS) conversion and voice recognition in the invention, incorporating the voice keyword table VKT in FIG. 2, and the setup controller in FIG. 1. Method 3 improves the voice recognition performance by sharing the same phonemes between TTS voice prompt and voice recognition recognition models. Setup controller 10 will generate proper pronunciation phoneme and user can edit the pronunciation phoneme under the guide of TTS prompt and according his/her habitual pronunciation, once the pronunciation phoneme is confirmed, system will further generate VR model for recognition. Thus the voice recognition performance can be enhanced based on user's habit. The method in FIG. 3 uses common phoneme strings in TTS and voice recognition, so that the setup controller can produce voice keyword table VKT that is adaptive to the user's pronunciation preference thus enhance the recognition performance. The steps above the dotted line provide text-to-speech conversion, and those below for voice recognition model generation.

In step S310, setup controller 10 receives text stream "Home" from S300 for example, the label field 20a in FIG. 2a, and generate pronunciation phonemes for "Home" S312 out of all phonemes S302 of the language. The word-to-phoneme algorithm S310 which may search a pronunciation dictionary or apply pronunciation generation rules for out-of-dictionary text streams.

In step 320, Text-to-Speech module generates speech waveform S322 for "Home" according to phoneme string S312.

In step S330, setup controller 10 receives the phonemes S312 to generate a voice data based on the full set built-in speaker independent models S332. For example, system controller 126 fetches "h" "o" "m" models in S332 according to S312 in to generate the corresponding voice recognition models. S334 for "Home".

In step S340, setup controller 10 employs the speaker dependent speech data S342 and the speaker dependent models S334 to generate speaker dependent voice recognition models S344. Since speaker dependent models accommodates habitual pronunciation of the user, therefore the voice recognition rate is improved.

Figure 4:
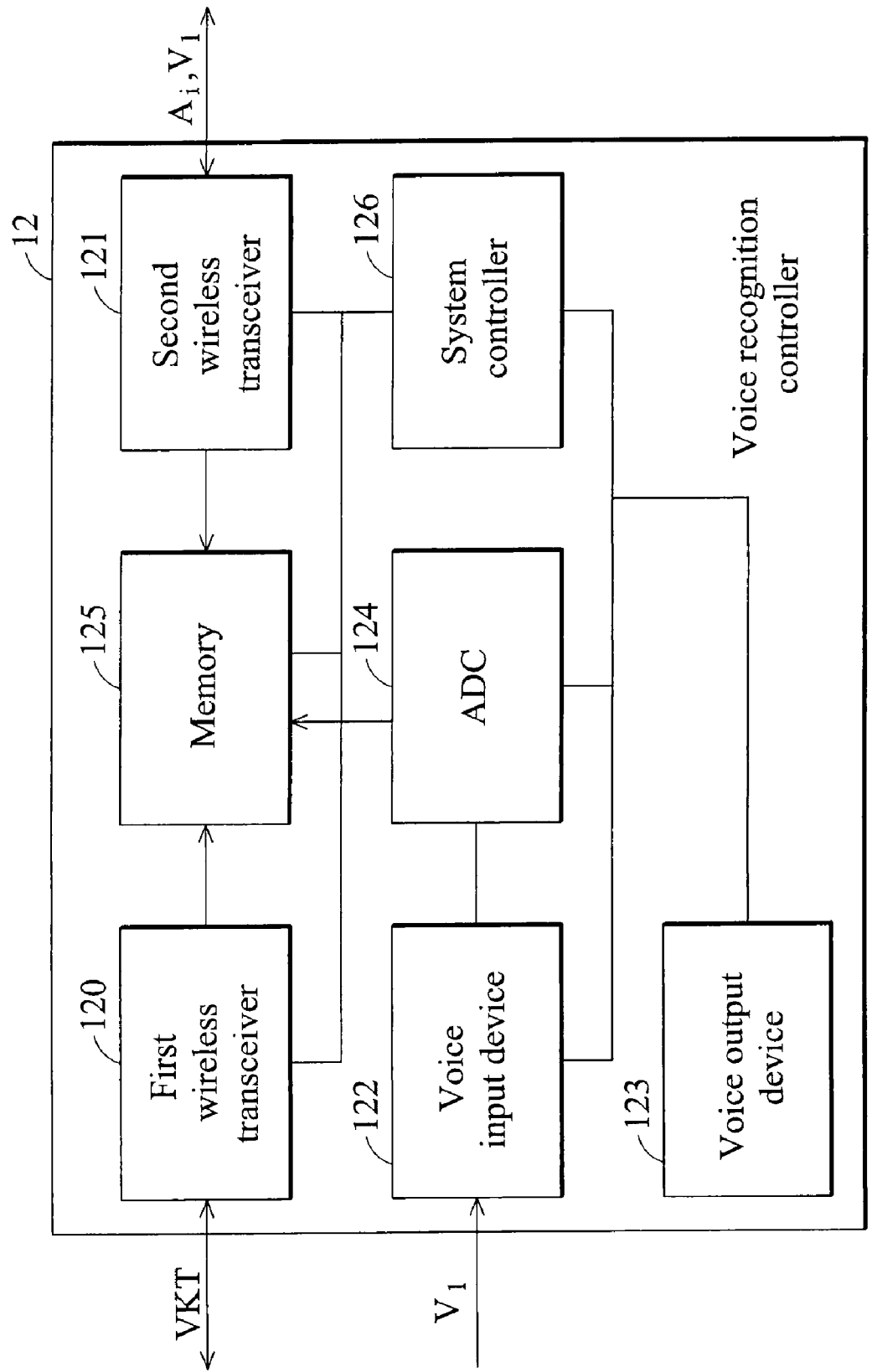
FIG. 4 is a block diagram of the voice recognition device in FIG. 1.

FIG. 4 is a block diagram of the voice recognition device in FIG. 1, comprising first wireless transceiver 120, second wireless transceiver 121, voice input device 122, voice output device 123, analog to digital converter 124, memory 125, system controller 126, and speaker 127.

First wireless transceiver 120 downloads VKT 100 from setup controller 10 to store in memory 125. Second wireless transceiver 121 transmits the corresponding application instruction Ai to and receives requested voice recognition keyword Vi and the corresponding application Ai from application controller 14, added into VKT 120 subsequently. Voice input device 122 may be a microphone, receiving first voice input $V_1$. Voice output device 123 may be a speaker playing voice data. Analog to digital converter (ADC) 124 converts first voice input $V_1$ from analog to digital. Memory 125 stores voice keyword table VKT 120, built-in speech models and parameters, and first voice input $V_1$. System controller (voice recognition module) 126 matches first voice input $V_1$ to voice keywords $V_i$ in table VKT to determine the corresponding application instruction Ai.

Figure 5:
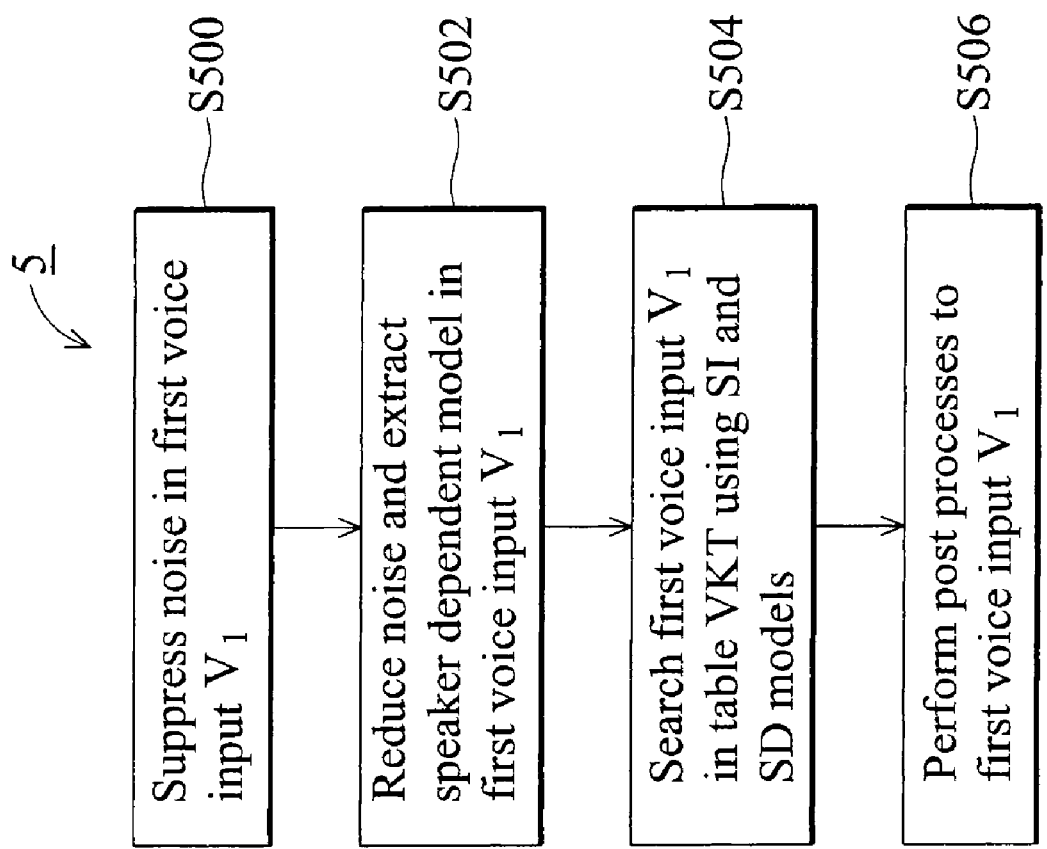
FIG. 5 is a flowchart of a voice recognition method of the invention.

FIG. 5 is a flowchart of a voice recognition method in the invention, incorporating the voice recognition controller in FIG. 4.

In step S500, noise in first voice input $V_1$ is suppressed in time domain to provide good signal quality.

In step S502, first voice input $V_1$ is converted to frequency domain to further reduce noise and extract speaker specific models therein.

In step S504, system controller 126 uses first voice input V1, speaker independent and speaker dependent speech models to search the voice recognizable keywords in table VKT.

In step S506, system controller 126 performs post-processes on first voice input $V_1$, such as, for example, execution of corresponding application instructions, first layer rejection, or generation of the success rate of voice recognition. If system controller 126 determines a first voice input $V_1$ match with a voice recognition keyword in table VKT, the corresponding application instruction is transmitted to application controller 14 for execution. If not, system controller 126 transmits first voice input $V_1$ to application controller 14 for second layer voice recognition. System controller 126 may establish a score system based on success rate of the first layer voice recognition.

FIG. 4 While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A communication system, comprising:
 a setup controller, receiving a voice keyword table including a voice recognizable keyword and a corresponding application instruction;
 a voice recognition controller, coupled to the setup controller, receiving the voice keyword table from the setup controller, receiving a first voice input and matching the first voice input to the voice recognizable keyword to determine the corresponding application instruction; and
 an application controller, coupled to the voice recognition controller, receiving and performing a corresponding application instruction,
 wherein the setup controller shares phonemes between Text-to-Speech (TTS) voice prompt and voice recognition models, and generates pronunciation according to the phonemes.

2. The communication system of claim 1, wherein the setup controller, the voice recognition controller, and the application controller communicate through wireless or wired communication.

3. The communication system of claim 1, wherein the voice recognition controller further transmits the first voice input to the application controller, if the first voice input does not match to any voice recognizable keyword in the voice keyword table.

4. The communication system of claim 3, wherein the application controller further determines a corresponding application instruction based on the first voice input, and transmits the first voice input and the corresponding application instruction to the voice recognition controller.

5. The communication system of claim 1, wherein the voice keyword table is a phonebook, the voice recognizable keyword is a pronunciation of a name entry, and the corresponding application instruction is dialing a predetermined number.

6. The communication system of claim 1, wherein the voice recognizable keyword is a pronunciation of a command entry, and the corresponding application instruction controls or receives information.

7. The communication system of claim 1, wherein the voice recognizable keyword is a pronunciation of a digit entry, and the corresponding application instruction is dialing the digit.

8. The communication system of claim 1, wherein the setup controller further receives a second voice input, and validates the voice recognizable keyword if the second voice input matches the voice recognizable keyword.

9. The communication system of claim 1, wherein the setup controller further changes the voice recognizable keyword by a user.

10. The communication system of claim 1, wherein the voice recognition controller comprises:
 a first transceiver, downloading the voice keyword table from the setup controller;
 a second transceiver, transmitting the corresponding application instruction to the application controller;
 a voice input device, receiving the first voice input;
 an analog to digital converter (ADC), coupled to the voice input device, converting the first voice input to digital;
 memory, coupled to the first and the second transceivers, storing the voice keyword table; and
 a voice recognition module, coupled to the ADC and the memory, matching the first voice input to the voice recognizable keyword to determine the corresponding application instruction.

11. The communication system of claim 1, configured such that a user can edit the pronunciation phonemes under the guide of the TTS prompt, and an updated voice recognition model is generated according to the edited pronunciation phonemes.

12. A method of voice recognition in a communication system, comprising:
 a setup controller receiving a voice keyword table including a voice recognizable keyword and a corresponding application instruction;
 a voice recognition controller receiving the voice keyword table, and matching a first voice input to the voice recognizable keyword to determine the corresponding application instruction;
 an application controller receiving and performing the corresponding application instruction; and the setup controller sharing phonemes between Text-to-Speech (TTS) voice prompt and voice recognition models, and generating pronunciation according to the phonemes.

13. The method of claim 12, wherein the setup controller, the voice recognition controller, and the application controller communicate through wireless or wired communication.

14. The method of claim 12, further comprising the voice recognition controller transmitting the first voice input to the application controller if the first voice input does not match any voice recognizable keyword in the voice keyword table.

15. The method of claim 14, further comprising the application controller determining a corresponding application instruction based on the first voice input, and transmitting the first voice input and the corresponding application instruction to the voice recognition controller.

16. The method of claim 12, wherein the voice keyword table is a phonebook, the voice recognizable keyword is a pronunciation of a name entry, and the corresponding application instruction is dialing a predetermined number.

17. The method of claim 12, wherein the voice keyword table is a phonebook, the voice recognizable keyword is a pronunciation of a name entry, and the corresponding application instruction is dialing a predetermined number.

18. The method of claim 12, wherein the voice recognizable keyword is a pronunciation of a command entry, and the corresponding application instruction controls or receives information.

19. The method of claim 12, further comprising the setup controller receiving a second voice input, and validating the voice recognizable keyword if the second voice input matches the voice recognizable keyword.

20. The method of claim 12, further comprising the steps of a user editing the pronunciation phonemes under the guide of the TTS prompt, and generating an updated voice recognition model according to the edited pronunciation phonemes.

* * * * *